US009947367B2

(12) United States Patent
Samra et al.

(10) Patent No.: US 9,947,367 B2
(45) Date of Patent: Apr. 17, 2018

(54) ASSIGNMENT OF A LOCAL PHYSICAL USER INTERFACE CONTROL FUNCTION TO A REMOTE PHYSICAL USER INTERFACE CONTROL FOR LOCAL CONTROL IN A MEDIA PRODUCTION SYSTEM

(75) Inventors: Sukendeep Samra, Venice, CA (US); Mark A. van den Bergen, Scoresby (AU); Steven Hall, Woodland Hills, CA (US); Jason Peterson, Studio City, CA (US); Stephen Dyson, Marina del Rey, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 774 days.

(21) Appl. No.: 13/356,229

(22) Filed: Jan. 23, 2012

(65) Prior Publication Data

US 2012/0159342 A1 Jun. 21, 2012

Related U.S. Application Data

(63) Continuation of application No. 13/047,634, filed on Mar. 14, 2011, now Pat. No. 8,131,866, which is a
(Continued)

(51) Int. Cl.
*G06F 17/00* (2006.01)
*G11B 27/34* (2006.01)
(Continued)

(52) U.S. Cl.
CPC .............. *G11B 27/34* (2013.01); *G06F 3/048* (2013.01); *G06F 3/0484* (2013.01);
(Continued)

(58) Field of Classification Search
CPC ......... H04L 67/02; H04L 67/10; H04L 67/34; H04L 67/18; H04L 67/42; H04L 65/403; H04L 41/22; G06F 15/16; G06F 3/048; G06F 3/0484; G06F 3/04817; G06F 3/0482; G06F 3/04842; G06F 3/0486;
(Continued)

(56) References Cited

U.S. PATENT DOCUMENTS 4,482,924 A 11/1984 Brownstein
4,532,605 A 7/1985 Waller
(Continued)

OTHER PUBLICATIONS

Sumiyoshi, H. et al.,"Network-based Cooperative TV Program Production System," © 1996, IEEE, pp. 229-236.*
(Continued)

*Primary Examiner* — Cesar Paula
*Assistant Examiner* — James H Blackwell
(74) *Attorney, Agent, or Firm* — Trellis IP Law Group, PC

(57) ABSTRACT

A state of an application program can be stored and transferred to a remote system. The remote system attempts to recreate the original state of the application program. If the remote system is unable to do so, an image of the state of the application program is obtained, instead. Assignment of control to various functions of an application program is achieved by associating a function (i.e., modifying a parameter) with a user control at a remote location.

10 Claims, 6 Drawing Sheets

Related U.S. Application Data continuation of application No. 10/807,474, filed on Mar. 22, 2004, now Pat. No. 7,930,418, which is a continuation of application No. 09/929,526, filed on Aug. 13, 2001, now Pat. No. 6,789,109.

(60) Provisional application No. 60/271,376, filed on Feb. 22, 2001, provisional application No. 60/284,660, filed on Apr. 17, 2001.

(51) Int. Cl.
| | | |
|---|---|---|
| *G06F 3/0484* | (2013.01) | |
| *G06F 3/048* | (2013.01) | |
| *H04M 3/56* | (2006.01) | |
| *G06F 17/24* | (2006.01) | |
| *G11B 27/031* | (2006.01) | |
| *G11B 27/034* | (2006.01) | |
| *G06F 3/0481* | (2013.01) | |
| *G06F 3/0482* | (2013.01) | |
| *G06F 3/0486* | (2013.01) | |

(52) U.S. Cl.
CPC .......... *G06F 17/241* (2013.01); *G11B 27/031* (2013.01); *G11B 27/034* (2013.01); *H04M 3/567* (2013.01); *G06F 3/0482* (2013.01); *G06F 3/0486* (2013.01); *G06F 3/04817* (2013.01); *G06F 3/04842* (2013.01)

(58) Field of Classification Search
CPC .... G06F 17/241; G06Q 10/10; G06Q 10/101; G06K 9/00; H04M 3/42314; H04M 11/10; H04M 3/567; Y10S 379/908; G11B 27/031; G11B 27/034
USPC ....... 715/200–204, 234, 255, 719, 723, 733, 715/740, 751, 759, 804, 853; 386/278, 386/282; 345/1.1, 156, 418; 709/205
See application file for complete search history.

(56) References Cited

U.S. PATENT DOCUMENTS

| | | | |
|---|---|---|---|
| 4,538,188 A | 8/1985 | Barker | |
| 4,751,507 A | 6/1988 | Hama | |
| 4,831,447 A | 5/1989 | Lake | |
| 4,953,106 A | 8/1990 | Ganser | |
| 4,975,896 A * | 12/1990 | D'Agosto, III | ... H04M 3/42314 369/25.01 |
| 5,187,776 A | 2/1993 | Yanker | |
| 5,237,648 A | 8/1993 | Mills | |
| 5,253,338 A | 10/1993 | Tanaka | |
| 5,263,134 A | 11/1993 | Paal | |
| 5,365,579 A * | 11/1994 | Hendrickson | .......... G03B 31/04 348/E5.009 |
| 5,404,295 A | 4/1995 | Katz | |
| 5,438,654 A | 8/1995 | Drebin | |
| 5,490,246 A | 2/1996 | Brotsky | |
| 5,513,306 A | 4/1996 | Mills | |
| 5,517,607 A | 5/1996 | Nishimura | |
| 5,600,775 A | 2/1997 | King | |
| 5,608,872 A * | 3/1997 | Schwartz et al. | ............. 709/205 |
| 5,650,799 A * | 7/1997 | Melen | ...................... G06K 9/00 345/172 |
| 5,729,673 A | 3/1998 | Cooper | |
| 5,758,110 A * | 5/1998 | Boss et al. | .................... 715/751 |
| 5,760,767 A | 6/1998 | Tao | |
| 5,808,662 A * | 9/1998 | Kinney | ................ G11B 27/002 348/14.1 |
| 5,844,563 A | 12/1998 | Harada | |
| 5,850,545 A | 12/1998 | Matsushita | |
| 5,852,449 A | 12/1998 | Esslinger | |
| 5,864,782 A | 1/1999 | Mederer | |
| 5,870,559 A | 2/1999 | Leshem | |
| 5,880,858 A | 3/1999 | Jin | |
| 5,890,130 A | 3/1999 | Cox | |
| 5,920,317 A | 7/1999 | McDonald | |
| 5,930,446 A | 7/1999 | Kanda | |
| 5,982,350 A | 11/1999 | Hekmatpour | |
| 6,005,535 A | 12/1999 | Takagi | |
| 6,046,722 A | 4/2000 | Keil | |
| 6,085,185 A | 7/2000 | Matsusawa | |
| 6,105,063 A | 8/2000 | Hayes | |
| 6,204,840 B1 | 3/2001 | Petelycky | |
| 6,211,870 B1 * | 4/2001 | Foster | ........................... 715/744 |
| 6,229,536 B1 | 5/2001 | Alexander | |
| 6,263,346 B1 | 7/2001 | Rodriquez | |
| 6,266,053 B1 | 7/2001 | French | |
| 6,307,550 B1 | 10/2001 | Chen | |
| 6,340,971 B1 | 1/2002 | Janse | |
| 6,392,674 B1 | 5/2002 | Hiraki | |
| 6,404,925 B1 | 6/2002 | Foote | |
| 6,430,609 B1 | 8/2002 | Dewhurst | |
| 6,449,653 B2 | 9/2002 | Klemets | |
| 6,452,615 B1 | 9/2002 | Chiu | |
| 6,467,080 B1 | 10/2002 | Devine | |
| 6,470,100 B2 | 10/2002 | Horiuchi | |
| 6,529,215 B2 | 3/2003 | Golovchinsky | |
| 6,587,123 B2 | 7/2003 | Ando | |
| 6,590,583 B2 | 7/2003 | Soohoo | |
| 6,597,375 B1 | 7/2003 | Yawitz | |
| 6,601,087 B1 * | 7/2003 | Zhu et al. | ..................... 709/205 |
| 6,683,619 B1 | 1/2004 | Samra | |
| 6,750,890 B1 | 6/2004 | Sugimoto | |
| 6,873,344 B2 | 3/2005 | Samra | |
| 6,897,880 B2 | 5/2005 | Samra | |
| 7,075,536 B1 | 7/2006 | Goldschmidt | |
| 7,129,961 B1 | 10/2006 | Samra | |
| 7,930,418 B2 | 4/2011 | Samra | |
| 2002/0032768 A1 | 3/2002 | Voskuil | |
| 2002/0158887 A1 | 10/2002 | Samra | |
| 2003/0001844 A1 | 1/2003 | Driemeyer | |
| 2004/0068567 A1 | 4/2004 | Moran | |
| 2004/0078215 A1 | 4/2004 | Dahlin | |
| 2004/0260790 A1 * | 12/2004 | Balloni et al. | ................ 709/219 |

OTHER PUBLICATIONS

Baker, E. et al.,"Media Production: Towards Creative Collaboration Using Communications Networks," © 1999, Kluwer Academic Publishers, pp. 303-332.*

Aldred, BK et al.,"Overlay Mechanism for Annotating Sharing and Remote Window-Control," © Jun. 1, 1993, ip.com, pp. 407-410.*

Nusbickel, WL et al.,"Remote Control and Synchronization of Multimedia Workstations," © Apr. 1, 1994, ip.com, pp. 271-274.*

Bakoglu, HB,"Integrated Audio-Graphics User Interface," © Apr. 1, 1991, ip.com, pp. 368-371.*

Fonseca, JB,"Collaborative Editing of Digital Video," © 1999 Distributed Imaging (Ref. No. 1999/109), IEE European Workshop, pp. 20/1-20/5.*

Nadas et al.; Grape: An Enviroment to Build Display Process; Jul. 1987; ACM; Computer Graphics; vol. 21; No. 4; pp. 75-84.

* cited by examiner

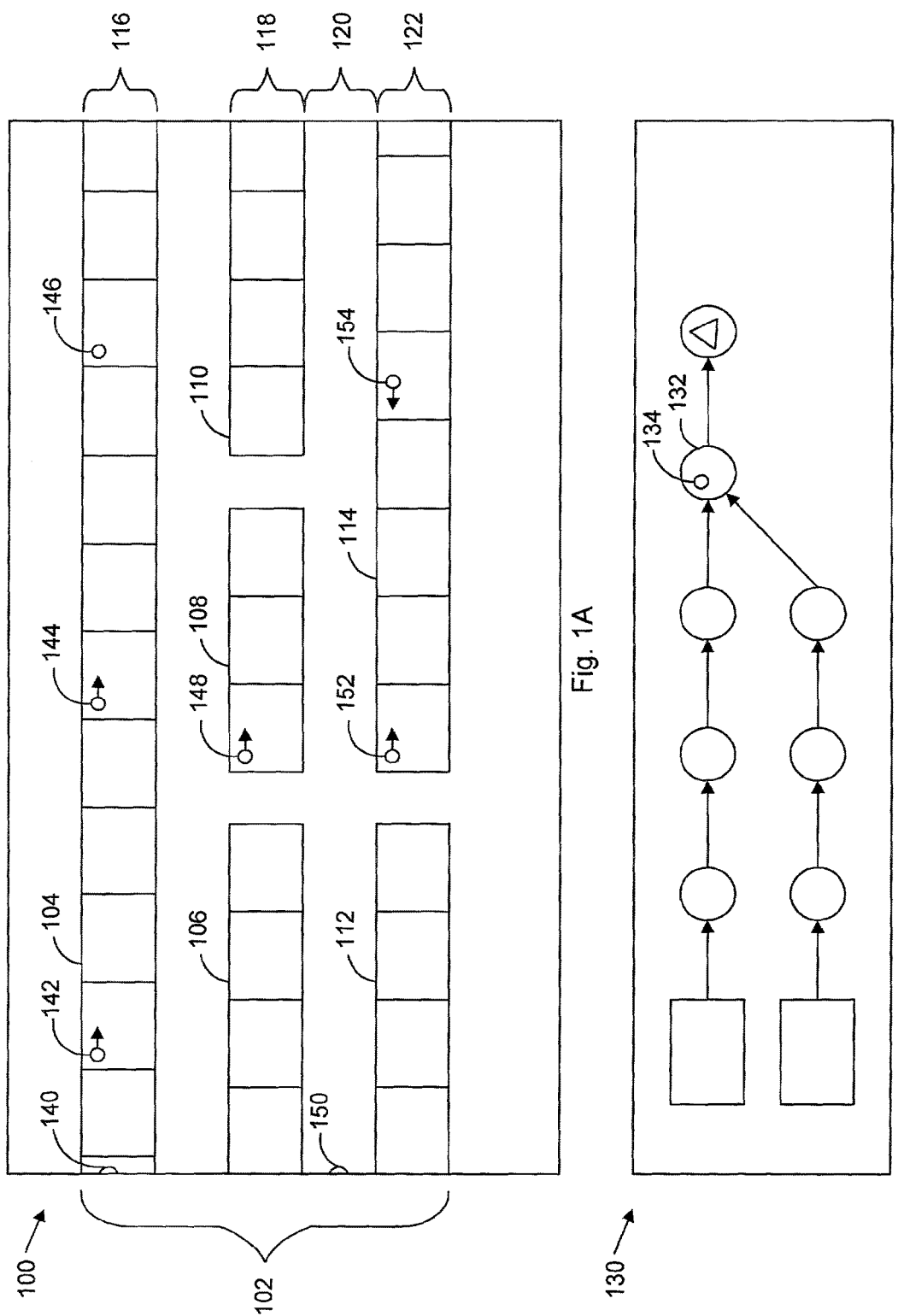

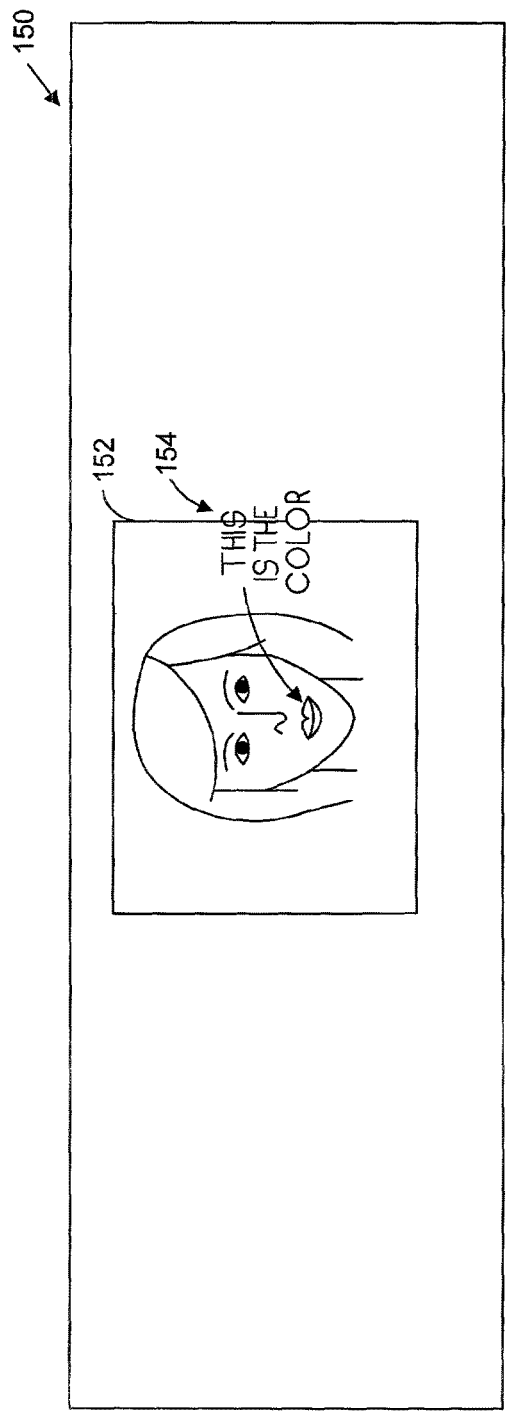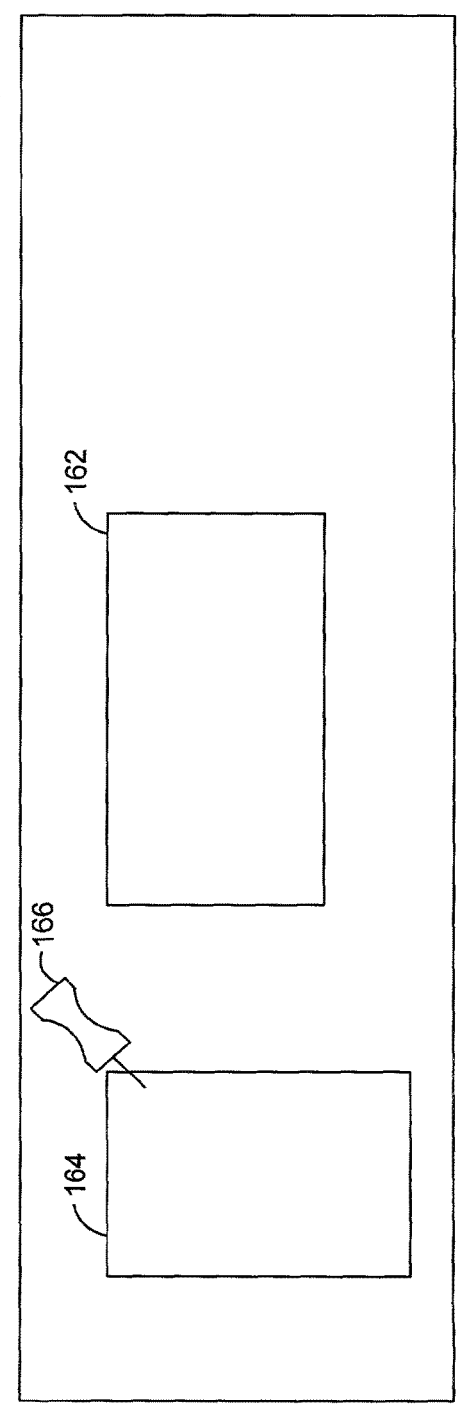

ASSIGNMENT OF A LOCAL PHYSICAL USER INTERFACE CONTROL FUNCTION TO A REMOTE PHYSICAL USER INTERFACE CONTROL FOR LOCAL CONTROL IN A MEDIA PRODUCTION SYSTEM

CLAIM OF PRIORITY

This application is a continuation of U.S. Pat. No. 8,131,866 issued on Mar. 6, 2012, that is a continuation of U.S. Pat. No. 7,930,418 issued on Apr. 19, 2011, that is a continuation of U.S. Pat. No. 6,789,109 issued on Sep. 7, 2004; that claims priority from the following U.S. Provisional Patent Applications:

1. Application Ser. No. 60/271,376; filed Feb. 22, 2001, entitled "A System and Method for Editing"; and
2. Application Ser. No. 60/284,660; filed Apr. 17, 2001, entitled "Advanced System and Method for Editing";

which are all hereby incorporated by reference, as is set forth in full in this specification for all purposes.

CROSS-REFERENCE TO RELATED APPLICATIONS

This application is related to the following U.S. Patent Applications:

1. U.S. Pat. No. 7,129,961 issued on Oct. 31, 2006, entitled "System And Method For Optimizing The Processing Of Images";
2. U.S. Pat. No. 6,683,619 issued on Jan. 27, 2004 entitled "System And Method For Increasing Performance When Composing Images";
3. U.S. Pat. No. 6,897,880 issued on May 24, 2005 entitled "User Interface for Generating Parameter Values in Media Presentations Based on Selected Presentation Instances";
4. U.S. Pat. No. 6,873,344 issued on Mar. 29, 2005 entitled "Media Production System Using Flowgraph Representation of Operations"; and,
5. U.S. Pat. No. 8,830,272 issued on Sep. 9, 2014 entitled "User Interface for a Digital Production System Including Multiple Viewing and Navigating";

BACKGROUND OF THE INVENTION

Today, digital systems are used to represent and process virtually all types of media in commercial, entertainment, educational and other fields. For example, visual media such as photographs, movies, video and animations are largely handled in the digital domain. Similarly, audio media such as speech, music, sound effects, etc., are also recorded, edited, produced, copied and transferred in the digital domain.

The production systems used to produce and manipulate digital media perform many other functions such as adding content and auxiliary information to the media, transferring portions of the media for review and approval, storing and indexing the media, etc. There are many possible operations on even a small media portion, such as on one of thousands of frames in a movie. These operations are often repeated many times by trial-and-error, and then extrapolated to larger segments of the production. There may be many hundreds or thousands of operations performed over weeks of creation. This is further compounded when many people are involved in creating, reviewing, or approving the production at steps along the way. Often, some of the people involved in the production are not technically inclined and, yet, must work in the highly technical and specialized environment provided by a sophisticated production system. To make the situation even more difficult, the production team members may be located in geographically remote places thus making communication and collaboration extremely difficult.

Thus, it is desirable to provide production system features to improve upon one or more shortcomings in the prior art.

BRIEF SUMMARY OF THE INVENTION

The invention provides a user interface to annotate different items in a media production system such as in a digital non-linear post production system. Parts of the production, such as clips, frames and layers, that have an associated annotation are provided with a visual annotation marker. The annotation marker can use shape, color or animation to convey source, urgency, status or other information. Annotations can be text, freehand drawing, audio, or other. Annotations can be automatically generated. Annotations can be compiled into records, searched and transferred. A state of an application program can be stored and transferred to a remote system. The remote system attempts to recreate the original state of the application program. If the remote system is unable to do so, an image of the state of the application program is obtained, instead. Assignment of control to various functions of an application program is achieved by associating a function (i.e., modifying a parameter) with a user control at a remote location.

In one embodiment the invention provides a method for annotating an item in a user interface of a media production system. The method includes accepting signals from a user input device to select a part of a production being processed by the media production system; creating annotation information; and storing the annotation information in association with the selected part of the production.

In another embodiment the invention provides a method for conveying the state of an application program to a remote location. The method includes determining to capture the current state of operation of the application program; saving one or more settings of a current environment of the application program as a recorded environment; and transferring the recorded environment to a remote location.

In another embodiment the invention provides a method for recreating the state of an application program at a process executing at a location remote from the application program, wherein a recorded environment includes settings for recreating the state of the application program. The method including receiving, over a digital network, the recorded environment; executing another instance of the application program at the location remote from the application program; and using the instance and the recorded environment to recreate the state of the application program at the location remote from the application program.

BRIEF DESCRIPTION OF THE DRAWINGS

FIG. 1A illustrates the use of annotation markers on clips and frames;
FIG. 1B shows a flowgraph panel with an annotated node;
FIG. 1C illustrates freehand drawing to annotate a frame;
FIG. 1D shows a persistent text annotation box.

DETAILED DESCRIPTION OF THE INVENTION

Figure 1E:
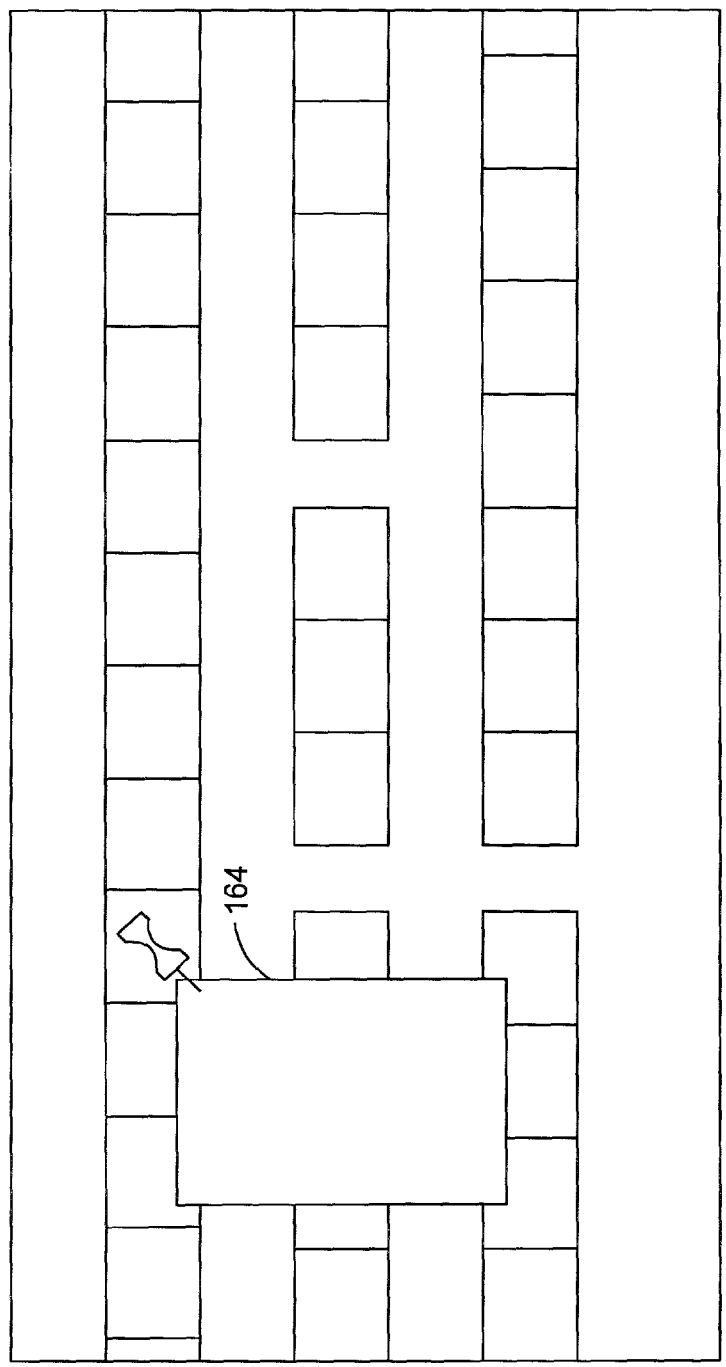
FIG. 1E shows the persistent text annotation box of FIG. 1D in a different panel.

For purposes of this application, any system that is used in association with producing a media production, including systems that provide one or more features for displaying, reviewing, modifying, annotating, transferring, editing, storing, etc., media productions is called a "production system." Details of a preferred embodiment production system are discussed in co-pending U.S. patent applications SYSTEM AND METHOD FOR OPTIMIZING THE PROCESSING OF IMAGES and SYSTEM AND METHOD FOR INCREASING PERFORMANCE WHEN COMPOSITING IMAGES, referenced above.

A preferred embodiment system is referred to as "Socratto" which is developed and marketed by VFX, a division of Sony Corporation. Although aspects of the present invention are described in connection with the Socratto system, it should be apparent that the invention is suitable for use with many different production systems having different ways to present information and to accept user inputs. Also, although the invention is described herein primarily with reference to film or video production systems, the invention is applicable to other types of media production systems such as computer-aided design, audio, animation, modeling, etc. Various aspects of the invention are applicable to any type of application program or functional system.

The present invention provides extensive annotation features for digital media production systems. Annotations can be image, text or audio information associated with parts of a media production such as image layers, frames, clips, reels, files, movies or other parts. Groups of parts can also have associated annotations. Such annotations are useful in collaborative situations where a note or instruction regarding a specific part of the production is sent to an operator, artist, etc. For example, the instruction "make clip #1839 look more like this" can be associated with clip #200. Similarly, clip #1839 can have an associated note such as "not finished—see clip #200 note". Many other types of instructions are possible. Associating instructions with parts of a production reduces the need to be in the same physical location to "point" to different parts. Also, the instructions, notes, comments and other annotations can be more easily transferred, catalogued, recalled, compiled and managed.

FIG. 1A illustrates the use of annotation markers on clips and frames.

In FIG. 1A, screen display 100 of the Socratto system includes top panel area 102, called a "reel" panel, or display. Top panel area 102 is used to display sequences of frames of visual media (e.g., for a movie) called "clips." Clips are shown as, e.g., clips 104, 106, 108, 110, 112 and 114. Each of four rows of top panel area 102 can be used to display clips. Each row of clips is referred to as a "reel". In FIG. 1A, examples of reels are 116, 118, 120 and 122. Note that reel 116 has a single displayed clip, clip 104. Clip 104 extends beyond the display area of screen display 100. There may be more clips associated with reel 116 located to the right or left of the displayable area. These clips remain conceptually associated with reel 116. Reel 118 has three displayed clips, namely clips 106, 108 and 110. Reel 120 does not have any displayed clips, but may have non-displayed clips and other information associated with it. Reel 122 includes displayed clips 112 and 114. Reels are organized into scenes. Scenes are collectively organized into a project. Projects, in turn, are associated with a final production. In the present example, the production is a movie.

As is known in the art, each reel can have transport, or playback, controls for playing the segments of the production represented by each individual clip. Also, navigation controls can be provided to move among, and selectively display and playback, clips in the reels; add, delete and move clips, etc. Other controls can provide for performing operations on clips, parts of clips, groups of clips, etc. Operations can include image property adjustments, image transitions, etc. Specific details on the general operation of a production system are included in co-pending U.S. patent applications referenced above. Such controls can be of various types and can be located anywhere in display screen 100, or on additional display screens. Controls can be external physical surfaces and devices, virtual mechanisms, etc.

Annotation markers are shown at 140, 142, 144, 146, 148, 150, 152 and 154. The annotation markers indicate that there is annotation information associated with a frame, clip, clip segment, reel, project or other part of a production. The annotation marker position and graphic image provide convenient, easily identified, information to a user of the production system without unduly cluttering the display.

In FIG. 1A, annotation markers 140 and 150 are positioned at the middle of a reel's row at the left edge of the screen. Annotation markers 140 and 150 are half-circle orange dots to indicate that annotation information is associated with reels 116 and 120, respectively.

Annotation marker 146 is a complete dot at the upper-left corner of a frame. This type of single-frame annotation marker tells the user that the annotation is intended to relate to the frame underlying annotation marker 146 only, or that the associated annotation may be most relevant to the underlying frame. Annotation marker 142 is a dot with a forward-pointing arrow in the upper-left corner of a frame of clip 104. This type of forward-pointing annotation marker indicates that the associated annotation is pertinent to this frame and onward through the clip. As with all annotation markers, there is no need for strict adherence to the predetermined meanings of the annotation markers. In other words, using a forward-pointing annotation marker where a single-frame annotation marker would be more appropriate does not affect the operation of the annotation operation. The annotation meanings and various indications are made available for use, as desired. Groups, or teams, of users will typically develop their own styles and new ways of using annotation tools. To this end, other embodiments of the invention can allow customizable annotation mechanisms, such as user-created icons or images for annotation markers.

Typically, an annotation's relevance ends when another annotation marker is encountered or at the end of the clip in which the annotation lies. For example, the annotation associated with annotation marker 144 would typically end at the frame before annotation marker 146. Annotation marker 148 pertains to the entirety of clip 108. Alternatively, "bookend" type annotation markers can be used to indicate the start and end of clip segments (or other production parts). Such an approach is shown with annotation markers 152 and 154 which are forward-pointing and backward-pointing annotation markers, respectively. Thus, the annotation associated with these markers is most relevant to the segment of clip 114 starting with the frame underlying forward-pointing annotation marker 152 and ending with the frame underlying annotation marker 154.

Annotation markers can be of different colors, shapes and animations. Colors can be used to identify a person, group, company, stage of production, etc., that generated the annotation. Colors can also be used to indicate the nature of the annotation, urgency, etc. For example, low-priority annotations can be represented by an orange annotation indicator while urgent, important, or critical annotation markers can use red. Colors can be changed automatically to indicate aging. A red marker can be made a deeper shade of red as time goes by. Animated annotation markers can also be used to convey information about the associated information. For example, blinking can be used to indicate urgency.

Annotation markers can be customized. Thus, a company that is involved in a production can annotate parts of the production with a unique annotation marker. Such a unique marker can be the company's logo, initials, or other functional or fanciful image. Similarly, individuals can be identified with their initials. One approach provides information on the annotation author when a pointer is moved over the annotation marker for a second or two. A pop-up box can show the author, subject, and brief description of the annotation.

Annotation markers can appear in connection with many parts of the production and in association with various controls, panels, displays, or other visual objects in the production system. For example, parts of a production can include multiple layers that make up a single frame. An annotation marker can appear on top of, or in association with, a display of a layer of a frame. Where the layers are red, green and blue (RUB) components, a frame showing just the red component, or layer, is typically displayed on the production system. The layer display can then include an annotation marker, similar to the approach of marking frames. Note that controls, panels (e.g., a playback panel), or any other features of the user interface can be annotated to describe settings, ask questions, etc.

FIG. 1B shows a flowgraph panel 130 with an annotated node. In a preferred embodiment, a flowgraph is used to represent operations graphically with "nodes" which are circles connected to each other by lines. In a preferred embodiment, a flowgraph is used to represent operations graphically with "nodes" which are circles connected to each other by lines. Individual nodes can have an annotation marker upon, or adjacent to, the node, such as annotation marker 134 on node 132. Thus, operations can easily be annotated in much the same way as items, or parts, discussed above.

Annotations can be created by various methods. When a user desires to create an annotation, the user selects an object to annotate. Typically, such an object (e.g., a frame, clip, layer, flowgraph node, etc.) has a graphic representation on the display screen. In such a case, the user can indicate the object to be annotated by selecting with a pointer and pressing a predetermined control such as a mouse button or keyboard button. Alternatively, a "tool tip" icon can be selected and then the object indicated. Any means of selecting an object for annotation is acceptable.

Once selected, user input is accepted to define the annotation. A dialogue box can appear to allow the user to type a text message. Since some users may be running the production system without a keyboard, a "softkey" keyboard can appear on the screen so that the user can select letters and other characters to create a text message. When the text message is completed, the annotated part is marked according to the methods described above. Text can occupy several pages. A rudimentary, or complex, text editor can be provided to help the user create text annotations.

A preferred embodiment of the invention accepts freehand "drawing" on the object, itself, as an annotation.

FIG. 1C illustrates freehand drawing to annotate a frame.

In FIG. 1C, display screen 150 shows frame 152. The user has used freehand drawing to manipulate a mouse, graphic tablet, trackball, touch screen, or any type of input device to scrawl the phrase "THIS IS THE COLOR!" on the image and to draw an arrow and circle around a specific color. When the user has completed drawing, the drawn annotation is saved and associated with the frame. The frame is marked with an annotation marker. Selection of the annotation marker places the drawn information over the image so "pointing," or other indicating in the annotation is preserved. Note that the drawn information can extend beyond the frame area into other parts of the display screen. This is useful so that comments and indications can be made without obscuring portions of the image. The drawing does not destroy the visual representation of the object but is a separate overlay onto the object and the display area. Drawing tools can be provided such as a pencil, paintbrush, eraser, etc., tools.

Both text and drawing are visual annotations. Another type of visual annotation is an image such as a photograph or bitmap. Any type of digital image can be associated with a production part, or object, as an annotation. For example, a thumbnail image of a frame can be associated with another frame so that the frame becomes an image-annotated frame. The image-annotated frame will have an annotation marker upon it. When selected, the associated image is displayed at a position designated by the user who annotated the frame. Images, text and drawing types of annotation can be mixed and stored together as a single annotation associated with an object. In general, when visual annotations are displayed they can appear adjacent to, on top of, or overlapping the objects that they annotate, or other displayed items on the screen.

Another type of annotation includes a link to other information. For example, an annotation can launch a web browser to display a web page. Other applications can be launched to provide other information such as video playback of a clip, opening another project in another instance of the production system software, etc.

Yet another type of annotation is automatically created. For example, a "slate" annotation option can be enabled by the user. This causes the production system (or any other software) to add frames to the clip, or other production part, to include information from a database, or other program, utility or process, to add an artists' name, scene name, version number, date, company logo, etc.

One problem with using annotations is that a typical production system includes several different types of panels, or views. Often the user is switching between panels and views in order to perform operations on the media. Although such panel switching is necessary to provide enough viewspace to present information in an efficient and orderly manner, it often means that an item of interest in one panel is not visible in another. This might require the user to quickly switch back-and-forth between two or more panels to be able to achieve an operation.

In some cases, the annotation may include instructions for operations to be performed in a panel that is different from the panel that is displaying the annotation. A preferred embodiment of the invention allows annotations, objects, controls, and any other displayed item to be persistent among different panels. In order to make an item persistent, the user selects a tool and applies it to the item. The tool can be a "pushpin" icon on a toolbar. After the pushpin is selected, e.g., by "clicking" on the pushpin icon, it is applied to an item, e.g., by clicking on the item. The item is then persistent even though the panel changes.

FIG. 1D shows a persistent text annotation box.

In FIG. 1D, screen display 160 includes a frame display 162 and associated text annotation in text annotation box 164. Pushpin icon 166 has been placed onto text annotation box 164 to indicate that the box has been made persistent.

FIG. 1E shows persistent text annotation box 164 of FIG. 1D in a different panel.

In FIG. 1E, text annotation box 164 remains on the display screen even when panels are switched. In FIG. 1E, the panel type is the reel panel, discussed above, in connection with FIG. 1A. Note that the persistent annotation box remains visible on top of all of the reel clips and frames.

Typically, additional controls and information are provided in each panel view. For ease of use such controls and information are not shown. The persistent item can remain on top of any other displayed items or it can be assigned a display priority so that it is on top of, under, or between other displayed items. Priority assignments can be made by the user. Another approach is to make the persistent item transparent or semi-transparent so that items below the persistent item are not completely obscured.

Thus, by using persistent annotations, an annotation that gives instructions for the use of different panels, or views, can remain visible in different panels.

Annotations can be handled like traditional desktop windows and document data in that they can be resized, dragged, minimized, closed, copied, stored, etc. This provides another way to move annotations around in the panel area to aid in user interface control operations.

The invention provides for audio annotation. A voice recording (or any other audio) can be associated with an object or item. The voice-annotated object can use the same annotation marker, or a different marker (e.g., a "speaker" icon) that indicates an audio annotation. When the audio annotation marker is activated (e.g., by clicking on the marker) the audio is played back.

There may be many annotations in a given production, or project. The present invention provides navigation, display and organization features so that a user can gain more benefit from annotations.

A navigation system allows the user to move from one annotation to the next. In the reel panel shown in FIG. 1A, if annotation marker 142 is the "current" marker (i.e., the last one selected) then the user can advance successively to markers 144 and 146 by, e.g., pressing a hotkey, clicking on a transport icon, etc. From marker 146, clip 104 is scrolled forward to reveal the next annotation marker on the clip, or on the next clip within the reel. Similarly, the user can navigate backward from marker to marker.

Another approach is to provide a list of markers in a menu and jump to the marker (by displaying the frame, clip, or other part associated with the marker) after the user selects a marker from the menu.

Markers can be filtered so that only certain types of annotation markers are displayed while others are "hidden" or turned off. For example, the user can select audio markers, text markers, markers from a given individual, etc., for filtering. Other rules for filtering, searching and displaying markers can be employed. For example, one type of object that is important in production operations is called a "keyframe." A keyframe is usually the point where an operation begins. Thus, it may be useful for the user to filter out all annotation markers besides those that pertain to keyframes.

When annotations are hidden, they can still be displayed. Such "forced" display can be by hotkey, moving or pausing a pointer over an annotated item, etc. The forced display can display the annotation marker or a portion of the annotation, itself. For example, a small box can come up with a portion, or a smaller-scale, version of the associated annotation in the box.

Digital whiteboarding can be used to allow text, drawn, or other annotations to appear in real time in other users' environments. Such real-time shared annotations can be stored in the manner as discussed, above, to make permanent annotations, or can be transient so that they are not permanently stored.

Annotations can be managed by a designated manager, or supervisor, who is given special control. Annotations that are tasks to be completed by others can be listed in a display to show when the task was assigned, whether the task has been completed, etc. The manager can close the project for annotations. Closing the project for annotations prevents any further annotations from the users. Automatic alerting about creation, completion, deletion, etc., of annotations can be provided. Pop-up windows, chat boxes, etc., can be used to report on types of annotations, especially tasks. Such reporting can be turned off, or filtered, as desired. For example, a task, in the form of an annotation on a clip, can be targeted to a team of graphic artists by clicking a selector button when the annotation has been created. The annotation is propagated to the predefined team. A pop-up window alerts the team members that a new task has been scheduled. The header, or title, of the task appears in the pop-up window. Clicking on the header has the same effect as opening the annotation so that members can learn what the task requires.

Reports can be generated of all of the present, and past, annotations for a production. Ideally, annotation information is kept in a relational database (or other flexible database) so the information can be searched, queried and used in documents, spreadsheets, etc. For example, an Access database, SQL-compliant database, etc., can be employed. Thus, annotations generated for a specific-named scene, within a specified interval of time, etc., can easily be retrieved. Annotations, and documents or reports generated from the annotations, can be made available over the Internet. This allows people working remotely to have a high level of awareness of the different types of work going on in a production.

Reporting can include itemized charges of the work performed so far. For example, some production system operations, such as rendering, may require leased, or licensed, computer time. In such cases, the cost incurred for a specific rendering operation, during a period of time (e.g., daily, monthly), per user, etc., can be tracked and reported. Other processing, such as effects, transitions, etc., may require paying for processing time and can have an indication of the cost to perform the operation.

Reporting can also include future estimates of types of work to be performed. A keyword system can detect annotation words such as "render this clip" and can then determine an estimated cost for the rendering operation based on the size of the clip. Where an operation involves user participation, the system can calculate the time (and, hence, the cost) of the operation based on the user's past statistics to perform the operation. For example, if a user has performed 20 color balancing operations at an average of 45 minutes of user operation and 3 minutes of processor time then another request for color balancing can use these statistics to make a projection. A series of such prospective estimate can be used to create budget predictions for cost and time to complete larger parts of the production such as scenes, or the remaining work to be performed on a movie.

In general, any data obtained from, imported from, etc., another application program can be treated as annotation data. For example, an edit decision list (EDL) from a non-linear editing system typically includes scene names. These names can be treated as annotations in the production system. Another standardized information format is open media format (OMF).

The present invention provides features for version control, storing production sessions and for transferring and sharing production information.

As mentioned above, a production system is a large and versatile system for creating and handling various media. The production system includes different panels, or views, of information. Each panel typically provides numerous different tools, menus, displays, etc. As a user performs operations, various windows, images, and other items may appear in the display, be moved in position and size, etc. Thus, at any given instant in the use of a production system there may be many variations in the display, settings, selected tools, functions, parameters, and other characteristics of the user interface.

The changing user interface is sometimes referred to as the user's "environment." Since environments can change rapidly, it is difficult for users in two different places, operating two different production systems (or different instances of a same production system) to be in exactly the same environment. However, differences in the environment can cause communication problems. For example, if a first user tells (e.g., by a telephone conversation) a second user to select a menu option, the first user is assuming that the specific menu is available in the second user's environment. However, unless the users have performed the same steps in the same sequence, the environments may differ greatly and the menu option may not be readily available (i.e., visible) to the second user.

The present invention allows a user of the production system to preserve a "snapshot" of the environment. A user can merely activate a button control to record all of the settings of the display at the time the button control is pressed. The recorded environment can be handled like a file. This allows the recorded environment to be stored, copied, emailed, etc. A second user can activate the recorded environment to have the production system open with all of the same settings, media content, etc. to recreate the first user's environment at the time of recording.

A preferred embodiment of the invention also allows a user to open a recorded environment where the second user does not have an instance of the production system software resident locally, or otherwise available, on the second user's computer system.

Figure 2:
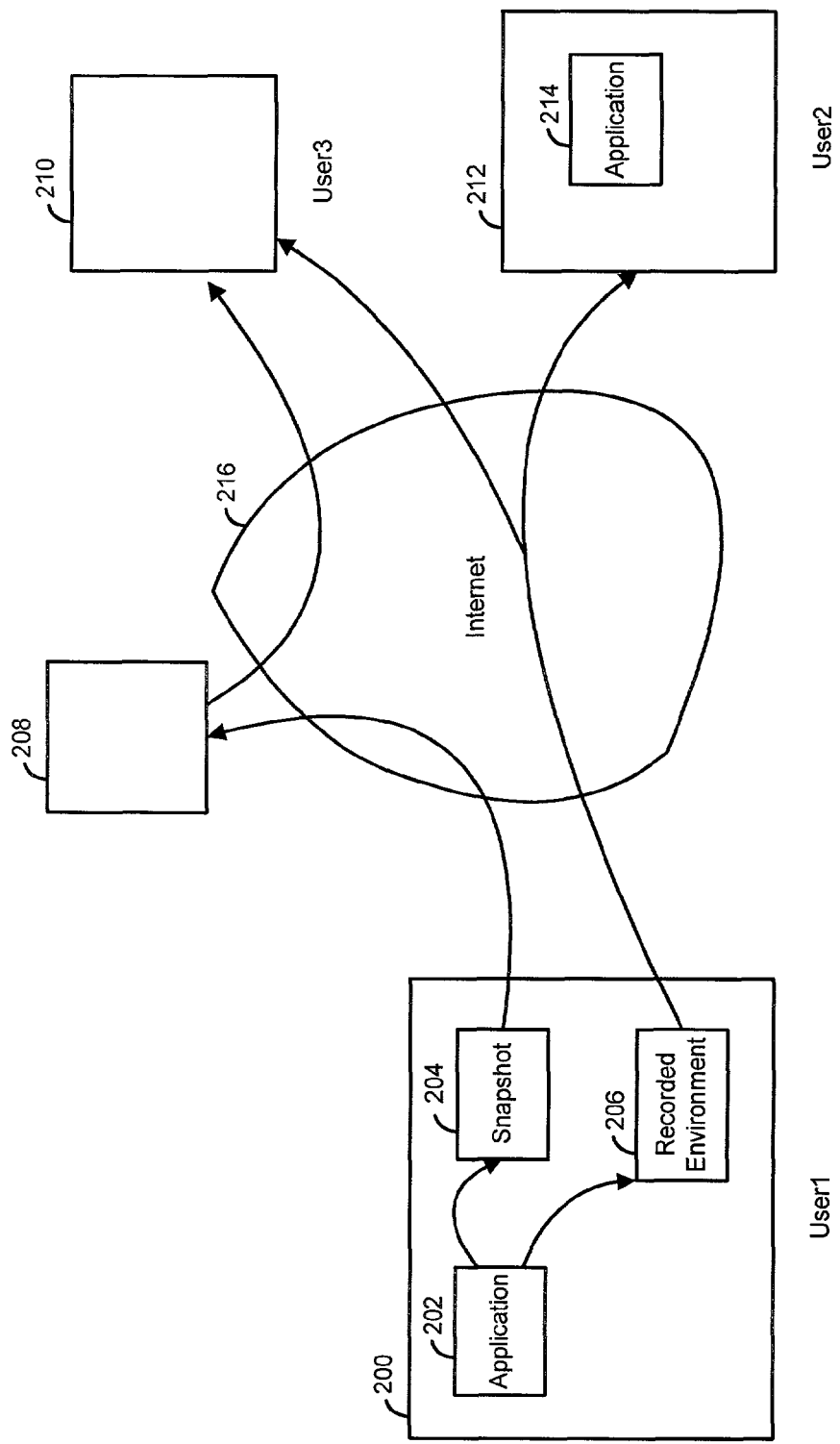
FIG. 2 illustrates use of a recorded environment.

FIG. 2 illustrates the creation, transfer, and opening of a recorded environment.

In FIG. 2, User1 operates computer system 200 that includes an instance of production system 202. Production system 202 is used to create both snapshot 204 and recorded environment 206. When User1's environment is recorded the invention also saves an image of the screen as snapshot 204. The snapshot can be scaled down in size, created at a lower resolution, etc. The snapshot can be stored locally to User1's computer, or elsewhere as long as it is available to a desired destination user. For example, the snapshot can be stored via Internet 216 (or other network such as a local-area network, campus network, etc.) to device 208. Device 208 can be a storage device, server computer, etc.

User1 sends recorded environment 206 to other users, such as User2 and User3 via Internet 216. When recording environment 206 is received by User2, production system 214 resident on User2's computer 212 is used to recreate the recorded environment using settings, images, and any other data and information provided by the recorded environment file.

In the present example, User3 does not have an instance of the production system 202 resident on User3's computer system 210. In this case, a process associated with recorded environment 206 obtains snapshot 204 from computer 208. The process can be part of the transferred environment, in a manner similar to a self-extracting file. The process can also be part of a stand-alone application program, a plug-in to, or integrated with, a web browser, etc. The process may be prevented from displaying the recorded environment for various reasons. For example, the application program might be missing from User2's computer system, or the application program may be present but not launchable due to lack of system resources, lack of a needed plug-in or other process, because User2 has not given permission for automatically launching the application program, etc.

Thus, even user's who do not have the necessary application program to fully recreate a recorded environment can, at least, view the screen image of the environment. In many cases of production such viewing may be enough to adequately communicate desired ideas and information.

The present invention provides for automated recording of an environment, and for automatic capturing of information at regular intervals (or based on other events). For example, a supervisor can specify that an environment be recorded and stored whenever a specific type of operation is performed (e.g., rendering), at specific times of the day, etc. This allows others to monitor the progress, and performance, of other members of a production team. Short of recording the environment, a simple snapshot of the screen can be taken and stored, uploaded, published, or transferred to achieve the same goal of monitoring and keeping team members up-to-date on remote users' work.

The automated recording can be customized so only selected portions of the production system's settings, or other information, are recorded. For example, a supervisor or user can select that only annotations are recorded and published at predetermined times. Status of publishing can be indicated to users so that a user is aware that a clip has just been published, is pending recording or publication, etc. Other embodiments can also use this approach for settings, environments, etc.

Figure 3:
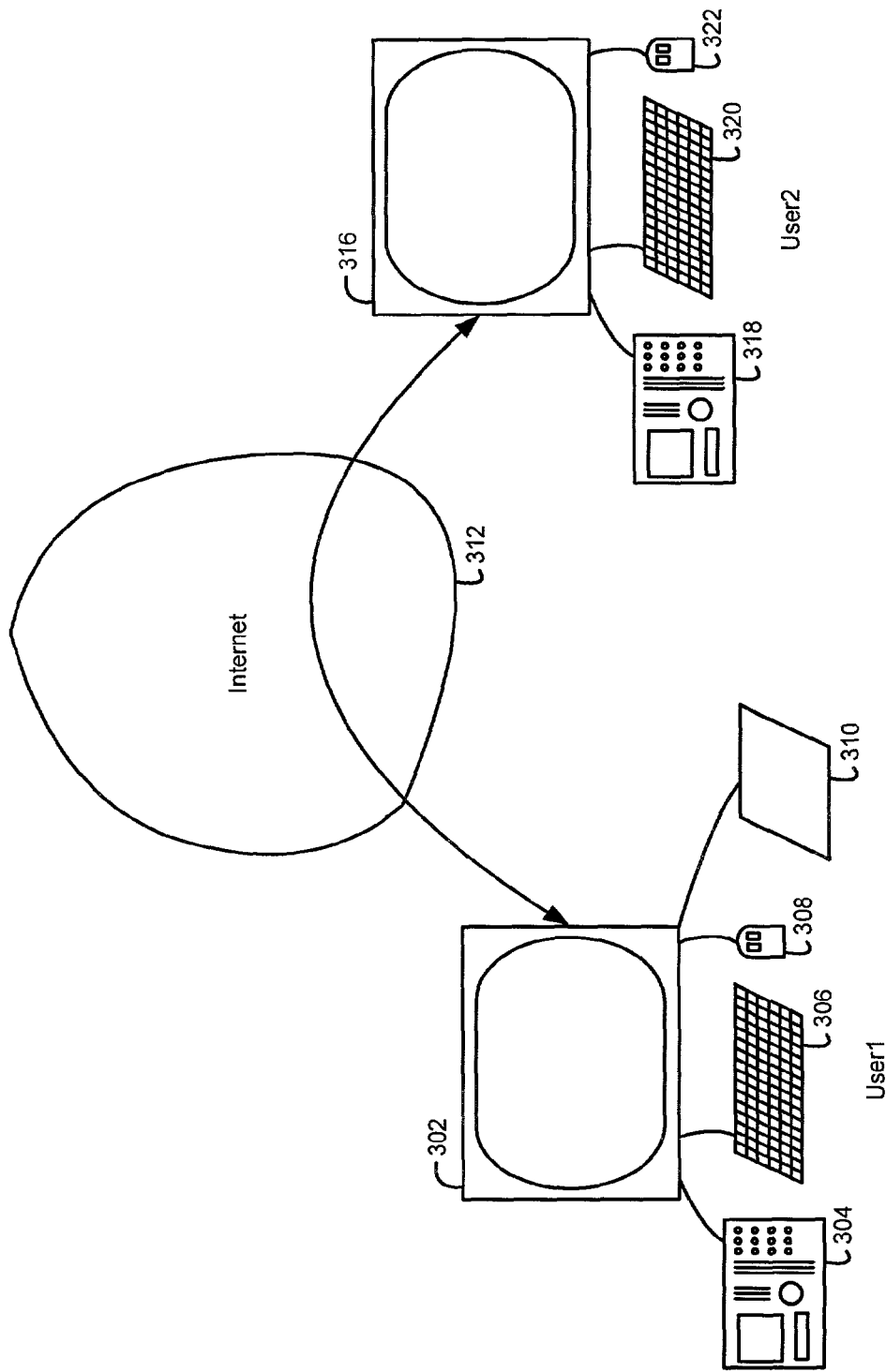
FIG. 3 illustrates the remotely assignable control features of the present invention.

FIG. 3 illustrates the remotely assignable control features of the present invention.

In FIG. 3, User1 is a primary operator of a production system executing on computer 302. Computer 302 includes physical user interfaces such as dedicated control panel 304, keyboard 306, mouse 308 and tablet 310. Naturally, any type of user interface can be used. Other types include a touchscreen, trackball, light pen, data glove, etc.

Computer system 302 executes the production system in communication with one or more other users and computer systems. A preferred embodiment uses Internet 312 for such communication, but any communication mechanism can be used. Computer system 302 can transfer information with User2 at computer 316. Each computer in communication with computer 302 can have varying degrees of features such as user interface devices, software, etc. As shown in FIG. 3, User2's computer 316 includes dedicated control panel 318, keyboard 320 and mouse 322.

As discussed above, and in the related applications, many features are provided by a production system. Often controls are used to direct the playback start, stop, play speed, replaying of sections, etc., of clip portions while other operations are repeatedly performed on the clip in order to see the effect that the operation is having on the clip. The various parameters of the operation may need to be progressively changed many times in complex interactive ways in order to achieve the desired result.

When one user, such as an art director, is located remotely from another user, such as a graphic artist, it becomes extremely difficult to coordinate the complex interaction necessary to achieve the desired result. Even where screen-sharing is provided, one of the users, such as the director, may have a weak understanding of the operation of the production system and may only be able to communicate ideas about how to change the clip by using language that does not translate well to changing operation parameters. For example, a director may complain about a contrast problem with certain items, or lighting conditions, in a clip. The graphic artist must guess as to the correct filter to use, the filter parameter settings to be modified, which settings to try changing first, etc. In fact, the director's use of the word "contrast" may be a wrong choice.

The present invention allows the graphic artist (who, in this example, is the primary user and is more experienced with the use of the production system) to assign control of different parameters (or other functions, variables, operations, etc.) to the director. For example, where the art director is User1 and where the director is User2, the art director can assign control of a "luminance" parameter to a slider control on the director's dedicated control panel. The graphic artist can then tell the director to move "the slider labeled #1" up or down while the graphic artist controls the clip playback and other parameters, as desired. During playback, the director's computer 316 executes the production system in synchronization under control of the graphic artist's computer 302. The director's movement of the slider control in dedicated control panel 318 is sent to the graphic artist's computer 302 so that the clip playback can be changed in accordance with new luminance values based on the movement of the slider.

Any type of parameter modification, or other function or control, can be assigned by the graphic artist to any of the director's user interface devices. For example, hotkeys can be assigned to the director's keyboard, mouse movements and button presses can be given new functionality, etc. The dedicated control panel can include any manner of controls such as pushbuttons, sliders, knobs, pen and tablet, etc. Any type of input device can be used such as musical instrument data interchange (MIDI), type of devices.

Figure 4:
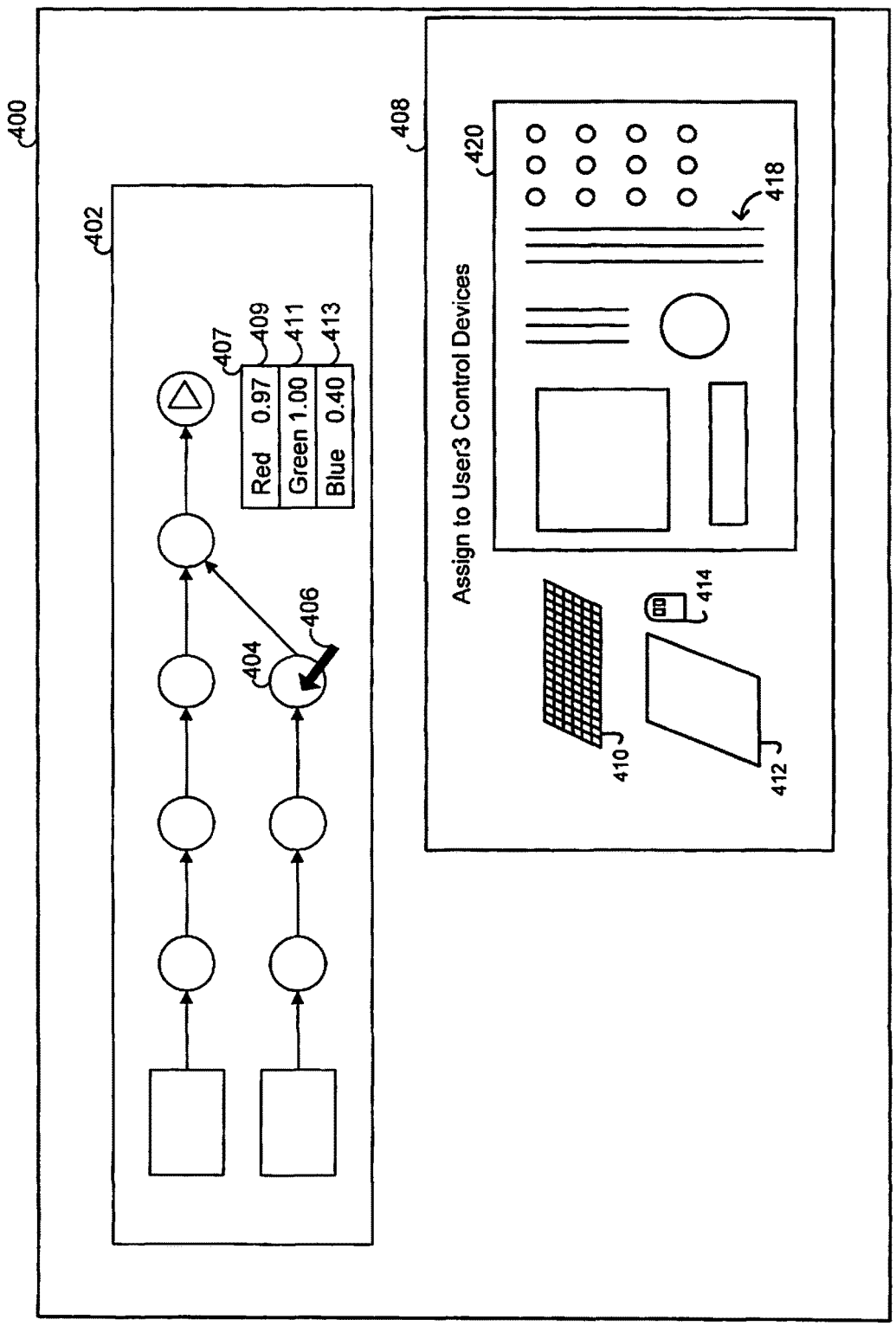
FIG. 4 illustrates drag-and-drop assignment of user interface mechanisms at the primary user's computer to control surfaces at a remote user's computer.

FIG. 4 illustrates drag-and-drop assignment of user interface mechanisms at the primary user's computer to control surfaces at a remote user's computer.

In FIG. 4, the primary user visually assigns parameter modification (or other control) to remotely located controls by dragging and dropping the production system's on-screen control for the parameter onto a small image of the target control device. In FIG. 4, screen display 400 includes flowgraph area 402 and images of remote control devices at 408. When pointer 406 is moved over node 404 in flowgraph area 400, and the user then selects node 404 to open for control, small user interface mechanisms such as text boxes, knobs, sliders, graphs, etc., appear to allow specific control of the node's parameters.

Parameter box 407 shows parameters in the example for node 404. The primary user can drag-and-drop any of the sub-boxes 409, 411 and 413, corresponding to parameters Red, Green and Blue respectively, onto different images of controls for remote user, User3. Each parameter can be assigned to a different one-dimensional control such as slider 418 on dedicated control surface 420, mouse direction movement for mouse 414, tablet direction movement for tablet 412, etc. If keyboard 410 is selected then a box appears on User3's computer system and User3 can enter an alphanumeric value from the keyboard. Where a parameter, or other control, is a momentary indication, such as a pushbutton (e.g., when to start a clip playback), then the "parameter" (e.g., a symbolic button or switch on the primary user's interface) can be dragged and dropped onto a momentary control surface such as a button on dedicated control surface 420, a single keypress on keyboard 410, one of the two mouse buttons on mouse 414, etc.

Any manner of assignment of the primary user's user interface mechanisms to a remote user's control surfaces can be accomplished. Multiple parameters can be assigned to a single control. Ranges of parameter variation can be controlled by the primary user. Two or more controls can be assigned to a single parameter. In this case, the parameter can receive an average value of both controls, or some other derivation of a value based on both controls. Each of the two or more controls can be assigned to different users in different locations. Any number of remote users can be given control of any type of parameter changing function, or other function. This provides an extremely convenient way for teams of users to work within the framework of a complex application program, such as a production system. Other variations are possible.

A remote user need not be running an instance of the production system on the remote user's local system. In such a case, the primary user's computer system can execute operations in the production system (on the primary user's computer) and the results of such operations (e.g., as bitmap frames, etc.) can be transferred to the remote user's computer for display.

Although the invention has been described with reference to specific embodiments thereof, these embodiments are merely illustrative, and not restrictive, of the invention. Many deviations from the specific embodiments are possible without departing from the scope of the invention. For example, any of the computers in FIG. 3 can act as a controlling computer. Many different ways to achieve synchronization, data sharing and control are possible and are within the scope of the present invention. For example, control signals generated at computer 316 can be used to directly control images on computer 316 instead of having the control signal information sent to computer 302 and having computer 302 generate images for transfer to computer 316. Computer 302 can generate directions for playback of a clip on computer 316, as opposed to sending frames of images across Internet 312. For example, computer 302 can direct computer 316 to begin playback of a clip that is already stored on computer 316. The two computers can remain in synchronization during the playback by methods that are known in the art.

In general, specific operations among computers or other processing devices in communication can be performed on any of the devices and communicated, as needed, to the other devices.

Although the invention has been discussed primarily with respect to production systems, it should be apparent that many aspects of the invention can be used with any type of application program, or various combinations of software and hardware systems.

Thus, the scope of the invention is to be determined solely by the appended claims.

What is claimed is:

1. A method for controlling a local media production system, the method comprising:
   a first user located at the local media production system identifying a function to be controlled, the function being performable at the local media production system;
   the first user located at the local media production system selecting a physical user interface control operable by a second user, the physical user interface control and the second user being located at a remote media production system communicatively and operably connected to the local media production system; and
   the first user located at the local media production system assigning the selected physical user interface control to the identified function so that in response to the second user's manipulation of the selected physical user interface control at the remote media production system, the identified function is performed at the local media production system.

2. The method of claim 1, wherein multiple parameters are assigned by the first user to the selected physical user interface control.

3. The method of claim 1, wherein two or more physical user interface controls are assigned by the first user to a same function at the local media production system.

4. The method of claim 3, wherein the same function includes a parameter.

5. The method of claim 4, wherein the parameter is assigned a value that is derived from two or more signals from at least two of the two or more physical user interface controls.

6. The method of claim 5, wherein the value is an average value, assigned using at least two inputs of the two or more physical user interface controls.

7. The method of claim 4, wherein each of the two or more physical user interface controls is on a control surface in a location, the location for each physical user interface control being different from the location for any other one of the two or more physical user interface controls.

8. The method of claim 1, wherein the function includes a parameter.

9. An apparatus comprising:
   a processor;
   a processor-readable storage device including one or more instructions executable by the processor for:
   a first user located at a local media production system identifying a function to be controlled, the function being performable at the local media production system;
   the first user located at the local media production system selecting a physical user interface control operable by a second user, the physical user interface control and the second user being located at a remote media production system communicatively and operably connected to the local media production system; and
   the first user located at the local media production system assigning the selected physical user interface control to the identified function so that in response to the second user's manipulation of the selected physical user interface control at the remote media production system, the identified function is performed at the local media production system.

10. A processor-readable non-transitory storage device including one or more instructions executable by a processor for:
    a first user located at a local media production system identifying a function to be controlled, the function being performable at the local media production system;
    the first user located at the local media production system selecting a physical user interface control operable by a second user, the physical user interface control and the second user being located at a remote media production system communicatively and operably connected to the local media production system; and
    the first user located at the local media production system assigning the selected physical user interface control to the identified function so that in response to the second user's manipulation of the selected physical user interface control at the remote media production system, the identified function is performed at the local media production system.

* * * * *